US008619917B2

(12) United States Patent
Chang et al.

(10) Patent No.: US 8,619,917 B2
(45) Date of Patent: Dec. 31, 2013

(54) DECODING APPARATUS AND METHOD OF TERMINAL IN WIRELESS COMMUNICATION SYSTEM

(75) Inventors: Jae-Hwan Chang, Suwon-si (KR); Kil-Ho Shin, Suwon-si (KR); Yun-Sang Park, Suwon-si (KR); Bong-Gee Song, Seongnam-si (KR); Byung-Tae Kang, Seoul (KR); In-Hyoung Kim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1300 days.

(21) Appl. No.: 11/647,948

(22) Filed: Dec. 29, 2006

(65) Prior Publication Data
US 2007/0153833 A1 Jul. 5, 2007

(30) Foreign Application Priority Data
Dec. 29, 2005 (KR) .................. 10-2005-0132861

(51) Int. Cl.
*H04L 27/06* (2006.01)

(52) U.S. Cl.
USPC ........... 375/340; 375/136; 375/147; 375/316; 375/324; 375/347; 370/332; 370/437; 370/468

(58) Field of Classification Search
CPC ... H04W 72/005; H04W 72/02; H04W 72/04; H04W 72/042; H04L 1/0015; H04L 1/0003; H04L 1/0009; H04L 1/0016; H04L 1/0017; H04L 1/0038; H04L 5/006
USPC ......... 375/316, 322, 324, 329, 332, 346, 347, 375/340, 136, 147; 370/477, 332, 437, 468; 455/63.1, 67.11
See application file for complete search history.

(56) References Cited

U.S. PATENT DOCUMENTS 5,968,197 A * 10/1999 Doiron ........................ 714/748
6,400,928 B1 * 6/2002 Khullar et al. ............. 455/67.11
6,782,037 B1 * 8/2004 Krishnamoorthy et al. .. 375/138

(Continued)

FOREIGN PATENT DOCUMENTS

| KR | 1020030066989 | 8/2003 |
|----|---------------|--------|
| KR | 1020050009663 | 1/2005 |
| KR | 1020050091598 | 9/2005 |
| WO | WO 02/30004   | 4/2002 |

OTHER PUBLICATIONS

IEEE 802.16 Broadband Wireless Access Working Group, Jul. 10, 2005.*

(Continued)

*Primary Examiner* — Sophia Vlahos
(74) *Attorney, Agent, or Firm* — The Farrell Law Firm, P.C.

(57) ABSTRACT

A decoding apparatus and method of a terminal in a wireless communication system are provided. A carrier to interference and noise ratio (CINR) estimator estimates a CINR value of a received signal, and a controller generates a modulation and coding scheme (MCS) level candidate set satisfying the estimated CINR value and a target packet error rate (PER) based on a look-up table. A decoder switch determines if an MCS level of a burst is included in the MCS level candidate set when the burst having no connection identifier (CID) information exists in a corresponding frame, and determines to decode the corresponding burst if the MCS level of the burst is included in the MCS level candidate set and to discard the burst otherwise.

20 Claims, 3 Drawing Sheets

(56) References Cited

U.S. PATENT DOCUMENTS

| | | | |
|---|---|---|---|
| 7,042,963 B1* | 5/2006 | Raith et al. | 375/341 |
| 7,145,940 B2* | 12/2006 | Gore et al. | 375/147 |
| 7,180,962 B2* | 2/2007 | Chang et al. | 375/316 |
| 7,187,657 B2* | 3/2007 | Koide et al. | 370/252 |
| 7,499,506 B2* | 3/2009 | Ghosh et al. | 375/329 |
| 2005/0018793 A1* | 1/2005 | Learned | 375/340 |

OTHER PUBLICATIONS

IEEE 802.16 Part 16: Air Interface for Fixed Broadband Wireless Access Systems Oct. 1, 2004.*

* cited by examiner

DECODING APPARATUS AND METHOD OF TERMINAL IN WIRELESS COMMUNICATION SYSTEM

PRIORITY

This application claims priority under 35 U.S.C. §119 to an application filed in the Korean Intellectual Property Office on Dec. 29, 2005 and allocated Serial No. 2005-132861, the contents of which are incorporated herein by reference.

BACKGROUND OF THE INVENTION

1. Field of the Invention

The present invention relates generally to a wireless communication system, and in particular, to a decoding apparatus and method of a terminal.

2. Description of the Related Art

Many wireless communication technologies have been proposed for high-speed mobile communications. Among them, Orthogonal Frequency Division Multiplexing (OFDM) and Orthogonal Frequency Division Multiplexing Access (OFDMA) are considered as the most powerful next generation wireless communication technology. OFDM/OFDMA technologies are expected to come into commercial use in most wireless communication technologies around 2010. Institute of Electrical and Electronics Engineers (IEEE) 802.16 Wireless Metropolitan Area Network (WMAN), called $3.5^{th}$ (3.5G) generation technology, adopts the OFDM/OFDMA technologies as standard specification.

OFDM scheme transmits data using a multi-carrier scheme. Specifically, the OFDM scheme is one of multi-carrier modulation schemes that parallel-converts serial symbol streams and modulates the parallel symbol streams into a plurality of sub-carriers having mutual orthogonality, i.e., a plurality of sub-carrier channels.

The OFDM scheme is similar to the Frequency Division Multiplexing (FDM) scheme, but can obtain optimal transmission efficiency during a high-speed data transmission by maintaining orthogonality between the sub-carriers. In addition, because the OFDM scheme overlaps the frequency spectrum, it can use the frequency band efficiently and is robust against frequency selective fading and multipath fading. Moreover, the OFDM scheme reduces the effect of intersymbol interference (ISI) by using a guard interval, simplifies the structure of an equalizer, and is robust against impulse noise. Thus, the OFDM scheme is widely used in the communication systems.

While OFDM allocates the entire resource, i.e., the sub-carriers to a single user, the OFDMA scheme allocates the sub-carriers to multi users. The information about the resource allocation is transmitted through a MAP message to which a high modulation and coding scheme (MCS) level is applied so that all subscriber terminals can commonly receive the information. Each user determines the location of the allocated resource and data control information by decoding the MAP message and transmits uplink data or downlink data.

Referring to FIG. 1, a carrier to interference and noise ratio (CINR) estimator 101 estimates a CINR value through a preamble of a downlink frame or a pilot signal. The CINR represents a channel quality (condition). An RX physical layer (PHY) buffer 103 stores downlink bursts and outputs them to a convolutional turbo code (CTC) decoder 105. CTC decoder 105 decodes the received bursts according to the MCS level and outputs the decoded bursts to a low medium access control (LMAC) buffer 107. LMAC buffer 107 stores the decoded bursts inputted from CTC decoder 105.

The MAP message includes a downlink-MAP (DL-MAP) message and an uplink-MAP (UL-MAP) message. The DL-MAP message includes an MCS level index of an allocated radio resource block, i.e., a downlink interval usage code (DIUC) and number of repetitions of a repetition code (hereinafter, referred to as a repetition), and location information of the radio resource block. In some cases, the DL-MAP further includes a connection identifier (CID) of a subscriber terminal that will use the allocated radio resource block. The UL-MAP message includes an MCS level index of the allocated radio resource block, i.e., uplink interval usage code (UIUC) and repetition, location information of the radio resource block, and CID of the subscriber terminal that will use the allocated radio resource block.

The CID is an MAC layer address to identify the connection and is called a basic CID in IEEE 802.16. In the downlink direction, the terminal discerns the incoming information by referring to the allocated CID. Thus, the terminal can receive the burst by decoding it to a corresponding MCS level. In the uplink direction, by referring to the inherent CID defined by the base station the terminal can transmit data through an interval defined by the base station.

However, there may exist bursts having no CID information within the frame. In this case, the terminal cannot obtain the CID information of the corresponding burst from the DL-MAP message. Therefore, the terminal decodes the bursts having no CID and then discerns its own data based on transport CID information loaded on a generic MAC header of a MAC packet data unit (PDU) within the corresponding burst. That is, the terminal tries to decode the bursts having no CID at all MAC levels, regardless of its own channel state or CINR representing the channel state.

When the CINR value is low, the decoding result may not satisfy a target packet error rate (PER), and this value may be useless in the upper layer. The target PER represents a target performance rate. The base station allocates the resource according to the channel conditions. Therefore, when the channel condition is poor, there is a low possibility that the base station transmits/receives data through a high MCS level. Consequently, the terminal unnecessarily operates the decoder for decoding the burst, thus wasting the power of the terminal with limited battery power.

SUMMARY OF THE INVENTION

An object of the present invention is to substantially solve at least the above problems and/or disadvantages and to provide at least the advantages below. Accordingly, an object of the present invention is to provide a decoding apparatus and method of a terminal in a wireless communication system.

Another object of the present invention is to provide an IEEE 802.16 OFDMA compliant channel decoding apparatus and method of a terminal in a wireless communication system, which determines whether to decode bursts according to quality of a received signal when CID of a specific burst does not exist in the MAP information.

A further object of the present invention is to provide a channel decoding apparatus and method of a terminal in a wireless communication system, which decodes only bursts satisfying a target PER when bursts having no CID exist.

According to an aspect of the present invention, a channel decoding apparatus of a terminal in a wireless communication system includes: a carrier to interference and noise ratio (CINR) estimator for estimating a CINR value of a received signal; a controller for generating a modulation and coding scheme (MCS) level candidate set satisfying the estimated CINR value and a target packet error rate (PER) based on a look-up table; and a decoder switch for determining if an MCS level of a burst is included in the MCS level candidate set when the burst having no connection identifier (CID) information exists in a corresponding frame, and for determining whether to decode the corresponding burst when the MCS level of the burst is included in the MCS level candidate set.

According to another aspect of the present invention, a channel decoding method of a terminal in a wireless communication system includes: estimating a CINR value of a received signal; generating a modulation and coding scheme (MCS) level candidate set satisfying the estimated CINR value and a target packet error rate (PER) based on a look-up table; and determining if an MCS level of a burst having no connection identifier (CID) in a corresponding frame is included in the MCS level candidate set, and decoding the corresponding burst when the MCS level of the burst is included in the MCS level candidate set.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Hereinafter, a decoding apparatus and method of a terminal in a wireless communication system will be described in detail.

Figure 1:
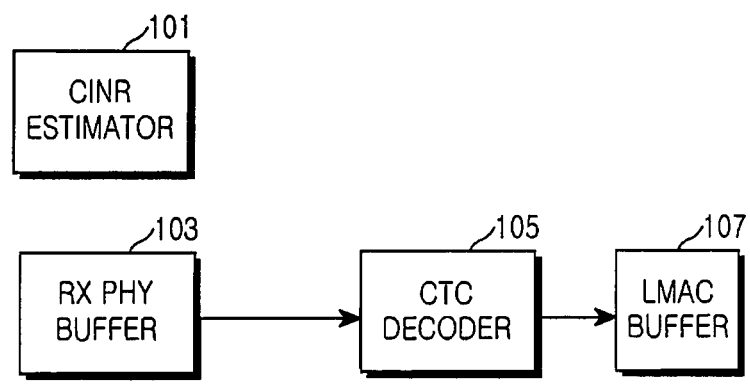
FIG. 1 is a block diagram of a conventional channel decoding apparatus of a terminal in a wireless communication system.
Figure 2:
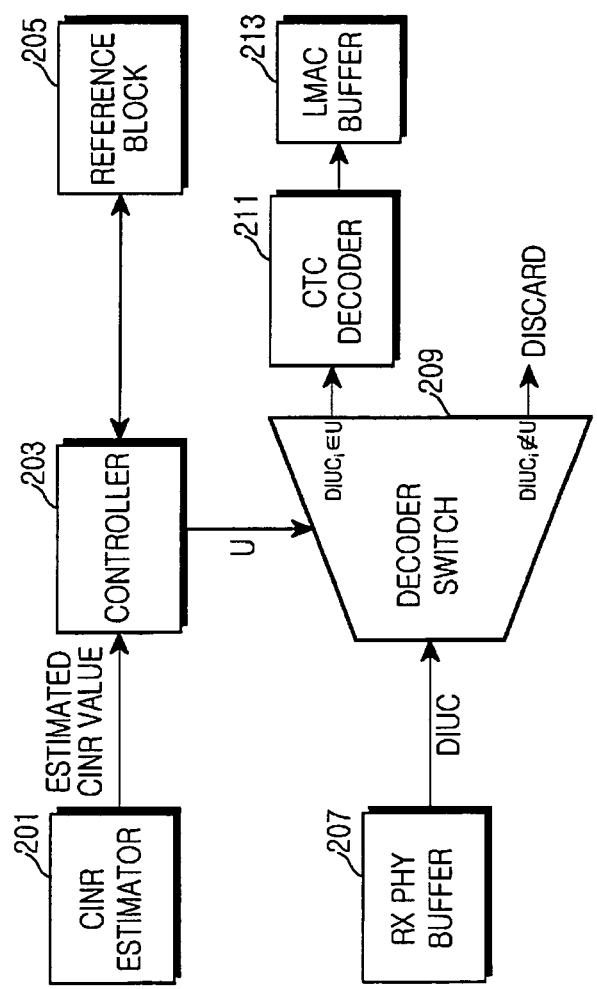
FIG. 2 is a block diagram of a channel decoding apparatus of a terminal in a wireless communication system according to the present invention.

Referring to FIG. 2, the decoding apparatus includes a CINR estimator 201, a controller 203, a reference block 205, an RX PHY buffer 207, a decoder switch 209, a CTC decoder 211, and an LMAC buffer 213.

CINR estimator 201 estimates a CINR value through the preamble of a downlink frame or a pilot signal and outputs the estimated CINR value to controller 203. The CINR represents a channel quality (condition). The CINR value outputted to controller 203 is an instantaneous CINR value or a mean value of CINRs observed during the most recent time period.

Controller 203 generates an MCS level satisfying a target PER, i.e., DIUC and a repetition candidate set U, based on the estimated CINR value and reference block 205, and then outputs the DIUC candidate set U to decoder switch 209. The target PER represents a target performance rate.

Reference block 205 includes a look-up table and stores information about the PER according to the CINR value and the MCS level, i.e., DIUC and repetition under additive white Gaussian noise (AWGN) environment. The look-up table is not necessarily the CINR level and the MCS level under the AWGN environment. For example, the look-up table can be given as Table 1.

TABLE 1

| PER | CINR | DIUC |
| --- | --- | --- |
| $10^{-\alpha}$ | A | a |
| | | b |
| | | c |
| | | d |
| | | e |
| | B | a |
| | | b |
| | | c |
| | C | a |
| | | b |

"A" is a high CINR value, and the CINR value becomes lower toward "C". The DIUC means a high MCS level value containing both the DIUC and repetition. "a", and the MCS level becomes lower toward "e". When the estimated CINR is high and is larger than the value A, the DIUC candidate set can include all MCS levels, a through e. However, when CINR is low and is larger than the value C but smaller than the value B, the DIUC candidate set must have higher MCS levels only, i.e. a and b. In a system where the target PER is $10^{-\alpha}$, when the CINR value estimated by CINR estimator 201 is greater than "B" and less than "A", the DIUC candidate set U generated by controller 203 is {a, b, c}.

RX PHY buffer 207 stores downlink bursts and outputs the bursts having the CID assigned to itself to CTC decoder 211, while it outputs the burst having no CID and the DIUC values of the corresponding bursts to decoder switch 209.

Decoder switch 209 determines whether to decode the burst by comparing the DIUCi value of the corresponding burst with the DIUC candidate set U. "DIUCi" means a DIUC and repetition of an $i^{th}$ burst among the bursts having no CID, which are received through a downlink subframe. That is, when the DIUCi values of the bursts having no CID exist within the DIUC candidate set, decoder switch 209 determines to decode the corresponding burst and outputs the corresponding burst to CTC decoder 211. In addition, when the DIUCi values do not exist within the DIUC candidate set, decoder switch 209 discards the corresponding burst.

CTC decoder 211 decodes the received bursts according to the MCS level and outputs the decoded bursts to LMAC buffer 213. For example, CTC decoder 211 may be implemented with a convolutional decoder, a low density parity check (LDPC) decoder, a turbo decoder, or a channel symbol expansion diversity (CSED) decoder. LMAC buffer 213 stores the decoded bursts inputted from CTC decoder 211.

Figure 3:
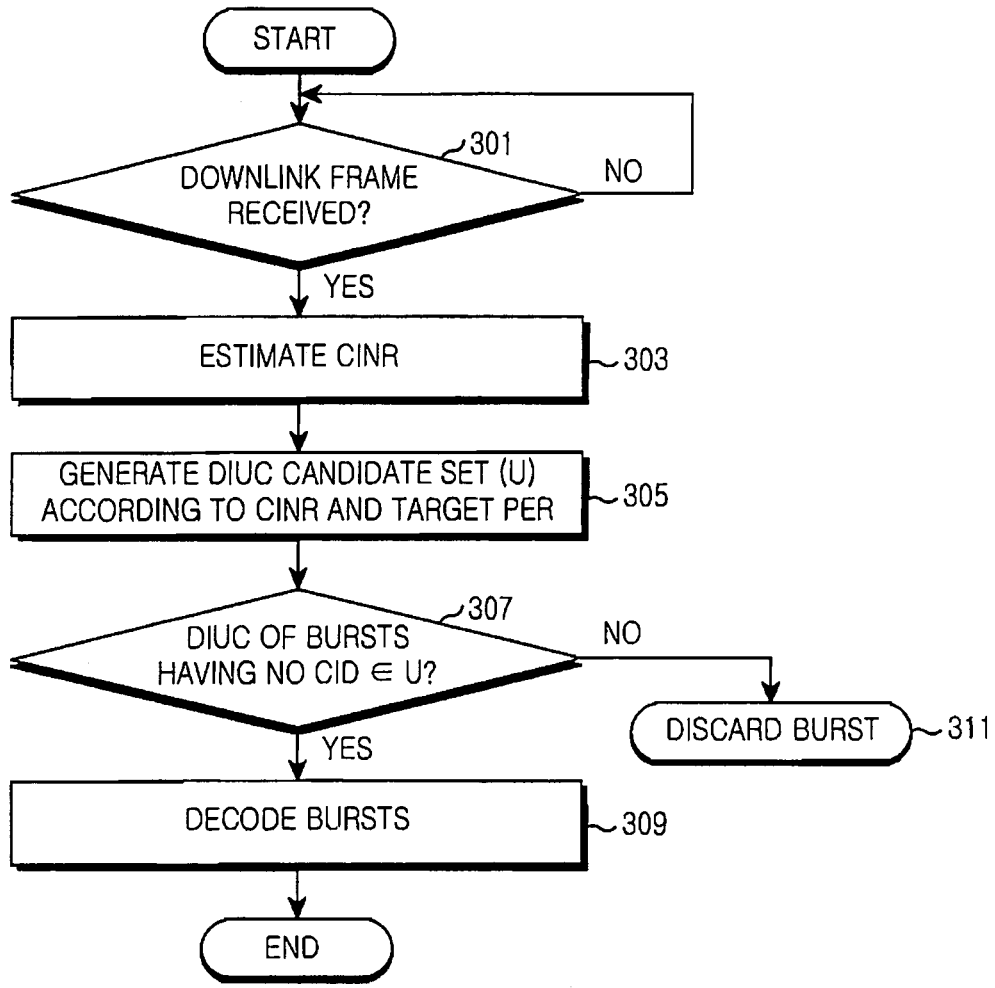
FIG. 3 is a flowchart illustrating a channel decoding method of a terminal in a wireless communication system according to the present invention.

Referring to FIG. 3, the terminal determines in step 301 if a downlink frame is received. In step 303, when the downlink frame is received, the terminal estimates the CINR value using the preamble of the downlink frame or a pilot signal. The CINR value is a mean value of the CINRs estimated for a predetermined time.

In step 305, the terminal generates a DIUC candidate set U satisfying the estimated CINR value and target PER by using the look-up table of Table 1.

In step 307, the terminal determines if the DIUC values of the bursts having no CID information in the corresponding frame are contained in the DIUC candidate set U. In step 309, when the DIUC values are contained in the DIUC candidate set U, the terminal decodes the corresponding bursts. In step 311, when the DIUC values are not contained in the DIUC candidate set U, the terminal discards the corresponding bursts. Then, the terminal terminates the procedure.

As described above, when the CID of a specific burst does not exist in the MAP information, the decoding apparatus and method of the terminal determines whether to channel-decode the corresponding burst according to the quality of the received signal. Unlike the existing wireless portable Internet system that must primarily decode all bursts having no CID, only the bursts satisfying the target PER among the bursts having no CID are decoded using the information about the mean value of the CINRs. Therefore, the power waste of the terminal can be prevented during the decoding process.

While the invention has been shown and described with reference to certain preferred embodiments thereof, it will be understood by those skilled in the art that various changes in form and details may be made therein without departing from the spirit and scope of the invention as further defined by the appended claims.

What is claimed is:

1. A channel decoding apparatus of a terminal in a wireless communication system, comprising:
    a carrier to interference and noise ratio (CINR) estimator for estimating a CINR value of a received signal;
    a controller for determining a range of available modulation and coding scheme (MCS) levels by including MCS level values that are higher than an MCS level which is set based on the estimated CINR value; and
    a decoder switch for determining whether an MCS level of a burst is included in the determined range of available MCS levels when the burst having no connection identifier (CID) information exists in a corresponding frame, by comparing a downlink interval usage code of the burst with a downlink interval usage code candidate set, and for decoding the burst when the MCS level of the burst is included in the determined range of available MCS levels,
    wherein a low estimated CINR value corresponds to a high MCS level.

2. The channel decoding apparatus of claim 1, wherein the CINR value is an instantaneous value of observed CINRs.

3. The channel decoding apparatus of claim 1, wherein the CINR value is a mean value of observed CINRs.

4. The channel decoding apparatus of claim 1, wherein the MCS level comprises a downlink interval usage code (DIUC) value and a repetition number of a repetition code.

5. The channel decoding apparatus of claim 1, wherein the MCS level comprises a repetition number of a repetition code.

6. The channel decoding apparatus of claim 1, further comprising:
    a physical layer buffer for outputting the burst and the MCS level values of the burst to the decoder switch when the burst having no CID information exists in the corresponding frame; and
    a decoder for decoding an eligible burst.

7. The channel decoding apparatus of claim 6, wherein the physical layer buffer outputs the burst having CID information in the corresponding frame to the decoder.

8. The channel decoding apparatus of claim 6, wherein the decoder is one of a convolutional decoder, a low density parity check (LDPC) decoder, a turbo decoder, and a channel symbol expansion diversity (CSED) decoder.

9. The channel decoding apparatus of claim 1, wherein the CINR value is estimated using a preamble of the corresponding frame.

10. The channel decoding apparatus of claim 1, wherein the CINR value is estimated using a pilot signal.

11. The channel decoding apparatus of claim 1, wherein the decoder switch discards the corresponding burst when the MCS level of the burst is not included in the determined range of available MCS levels.

12. A channel decoding method of a terminal in a wireless communication system, comprising:
    estimating a CINR value of a received signal;
    determining a range of available modulation and coding scheme (MCS) levels by including MCS level values that are higher than an MCS level which is set based on the estimated CINR; and
    determining whether an MCS level of a burst having no connection identifier (CID) information in a corresponding frame is included in the determined range of available MCS levels by comparing a downlink interval usage code of the burst with a downlink interval usage code candidate set, and decoding the burst when the MCS level of the burst is included in the determined range of available MCS levels,
    wherein a low estimated CINR value corresponds to a high MCS level.

13. The channel decoding method of claim 12, wherein the CINR value is estimated using a preamble of the frame.

14. The channel decoding method of claim 12, wherein the CINR value is estimated using a pilot signal.

15. The channel decoding method of claim 12, wherein the CINR value is an instantaneous value.

16. The channel decoding method of claim 12, wherein the CINR value is a mean value of observed CINRs.

17. The channel decoding method of claim 12, wherein the MCS level comprises a downlink interval usage code (DIUC) value and a repetition number of a repetition code.

18. The channel decoding method of claim 12, wherein the MCS level comprises a repetition number of a repetition code.

19. The channel decoding method of claim 12, wherein the MCS level comprises a downlink interval usage code (DIUC) value.

20. The channel decoding method of claim 12, further comprising:
    discarding the corresponding burst when the MCS level of the burst is not included in the determined range of available MCS levels.

* * * * *